(12) United States Patent
Choi et al.

(10) Patent No.: US 7,408,299 B2
(45) Date of Patent: *Aug. 5, 2008

(54) PLASMA DISPLAY PANEL

(75) Inventors: Seo-Young Choi, Yongin-si (KR); Hye-Kyong Kwon, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/999,117

(22) Filed: Nov. 29, 2004

(65) Prior Publication Data

US 2005/0134166 A1 Jun. 23, 2005

(30) Foreign Application Priority Data

Nov. 28, 2003 (KR) ............... 10-2003-0085493

(51) Int. Cl.
*H01J 17/49* (2006.01)
(52) U.S. Cl. ............... 313/582; 313/585; 313/586; 313/587; 313/486
(58) Field of Classification Search ......... 313/582–587
See application file for complete search history.

(56) References Cited

U.S. PATENT DOCUMENTS

| | | | |
|---|---|---|---|
| 5,674,553 A | 10/1997 | Shinoda et al. | |
| 6,420,835 B1 | 7/2002 | Chen et al. | |
| 6,498,430 B1 | 12/2002 | Sakai et al. | |
| 6,713,959 B1 | 3/2004 | Toyoda et al. | |
| 6,870,315 B2 * | 3/2005 | Iguchi et al. | 313/582 |
| 2002/0113552 A1 | 8/2002 | Juestel et al. | |
| 2002/0180354 A1 | 12/2002 | Sano et al. | |
| 2004/0114248 A1 * | 6/2004 | Hokazono et al. | 359/603 |
| 2005/0258751 A1 | 11/2005 | Kang | |

FOREIGN PATENT DOCUMENTS

| | | |
|---|---|---|
| EP | 0 884 754 A1 | 12/1998 |
| JP | 6-243789 | 9/1994 |
| JP | 10-247458 | 9/1998 |
| JP | 10-269949 | 10/1998 |
| JP | 11-96922 | 4/1999 |
| JP | 11-327498 | 11/1999 |

(Continued)

OTHER PUBLICATIONS

Patent Abstract of Japan, Publication No. 10-269949, Published on Oct. 9, 1998, in the name of Aoto, et al.

(Continued)

*Primary Examiner*—Mariceli Santiago
*Assistant Examiner*—Anne M Hines
(74) *Attorney, Agent, or Firm*—Christie, Parker & Hale, LLP

(57) ABSTRACT

A plasma display panel includes a red phosphor layer, a green phosphor layer, and a blue phosphor layer. The thickness of the red phosphor layer comprises $Y(V,P)O_4$:Eu and $(Y,Gd)BO_3$:Eu coated on a barrier rib and is satisfied by the following condition: when $D_r$ is $(S-2L)/S$, $D_r \geq 0.64$, S being a distance between barrier ribs at half the height of the barrier rib; and L being a side thickness at half the height of the barrier rib of the phosphor layer coated on the barrier rib.

44 Claims, 1 Drawing Sheet

FOREIGN PATENT DOCUMENTS

| | | |
|---|---|---|
| JP | 2000-208057 | 7/2000 |
| JP | 2002-251962 | 9/2002 |
| JP | 2003-288846 | 10/2003 |
| KR | 2002-0063395 | 8/2002 |
| KR | 2003-0036017 | 5/2003 |

OTHER PUBLICATIONS

European Search Report, dated Mar. 15, 2005, for publication No. 04090469.0, in the name of Samsung SDI Co., Ltd.
European Patent Office Patent Abstracts of Japan for Publication No. 11096922, publication dated Apr. 9, 1999, in the name of Y. Masaki.
Patent Abstracts of Japan, Publication No. 06-243789, published Sep. 2, 1994, in the name of Oka et al.
Patent Abstracts of Japan, Publication No. 10-247458, published Sep. 14, 1998, in the name of Nonaka et al.
Patent Abstracts of Japan, Publication No. 11-327498, published Nov. 6, 1999, in the name of Naka et al.
Patent Abstracts of Japan, Publication No. 100-208057, published Jul. 28, 2000, in the name of Asano et al.
Patent Abstracts of Japan, Publication No. 2002-251962, published Sep. 6, 2002, in the name of Juestel et al.
Patent Abstracts of Japan, Publication No. 2003-288846, published Oct. 10, 2003, in the name of Takamori.

* cited by examiner

PLASMA DISPLAY PANEL

CROSS REFERENCE TO RELATED APPLICATION

This application claims priority to and the benefit of Korean Patent Application No. 10-2003-0085493 filed in the Korean Intellectual Property Office on Nov. 28, 2003, the entire disclosure of which is incorporated hereinto by reference.

FIELD OF THE INVENTION

The present invention relates to a plasma display panel, and more particularly to a plasma display panel having good luminance and good color purity characteristics as well as a good optical characteristic in which discharge spots do not appear.

BACKGROUND OF THE INVENTION

A plasma display panel (PDP) is a flat display device using a plasma phenomenon, which is also called a gas-discharge phenomenon since a discharge is generated in the panel when a potential greater than a certain level is applied to two electrodes separated from each other under a gas atmosphere in a non-vacuum state. Such gas-discharge phenomenon is applied to display an image in the plasma display panel.

FIG. 1 is a perspective view of plasma display panel 1. As shown in FIG. 1, a plurality of barrier ribs 7 are disposed between front substrate 3 and back substrate 5 with a certain distance therebetween to form a discharge cell. In the cell space, red, green, and blue phosphors 9 are formed. On back substrate 5, address electrodes 11 to be applied with the address signal are formed. On front substrate 3, a pair of sustain electrodes (electrode X 13, electrode Y 15) is formed in one discharge cell in a perpendicular direction to that of the address electrodes. To the discharge space, a discharge gas such as Ne—Xe or He—Xe is injected. That is, three electrodes are mounted in the discharge space of the plasma display panel, which is coated with the red, the green, and the blue phosphors in a regular pattern. When a certain level of voltage is applied between these electrodes, plasma discharge occurs to generate ultraviolet rays, and thereby the phosphors are excited to emit the light.

Phosphor layer 9 is prepared by coating a phosphor paste on the surface of a discharge cell surrounded by front substrate 3, back substrate 5, and barrier rib 7. The phosphor paste is prepared by adding the phosphor to a binder and a solvent. When the side thickness of the phosphor contacting the barrier rib is too thick, a panel spot may occur in a slanting direction so that the luminance is decreased. However, attempts to control the side thickness of the phosphor layer in order to improve the optical characteristics of the plasma display panel have not yet been made.

SUMMARY OF THE INVENTION

In accordance with the present invention a plasma display panel is provided having good luminance and color purity characteristics as well as a good optical characteristic in which panel spots do not appear.

The present invention relates to a plasma display panel phosphor layer comprising a red phosphor layer, a green phosphor layer, and a blue phosphor layer, wherein the red phosphor layer comprises $Y(V,P)O_4:Eu$ and $(Y,Gd)BO_3:Eu$ and the side thickness of the phosphor layer coated on a barrier rib is satisfied by the following condition:

when $D$ is $(S-2L)/S$; $D \geq 0.64$ wherein:
S is a distance between barrier ribs at half the height of the barrier rib; and
L is a side thickness at the half height of the barrier rib of the red phosphor layer coated on the barrier rib.

The present invention also relates to plasma display panel having a pair of substrates with at least a transparent front surface to provide a discharge space therebetween. A plurality of barrier ribs are formed on one substrate to partition the discharge space into many spaces. A group of electrodes are formed on the substrates to generate a discharge in the discharge space partitioned by the barrier ribs. A red phosphor layer, a green phosphor layer and a blue phosphor layer are formed on the surface of the discharge space partitioned by the barrier ribs. The red phosphor layer comprises $Y(V,P)O_4:Eu$ and $(Y,Gd)BO_3:Eu$. The side thickness of phosphor layers formed on the barrier ribs is controlled to satisfy the following condition:

when $D$ is $(S-2L)/S$, $D \geq 0.64$ wherein:
D represents a discharge cell D value which is respectively formed with the phosphor layer;
S is a distance between barrier ribs at half the height of the barrier rib; and
L is a side thickness at half the height of the barrier rib of the phosphor layer coated on the barrier rib.

DETAILED DESCRIPTION

Figure 1:
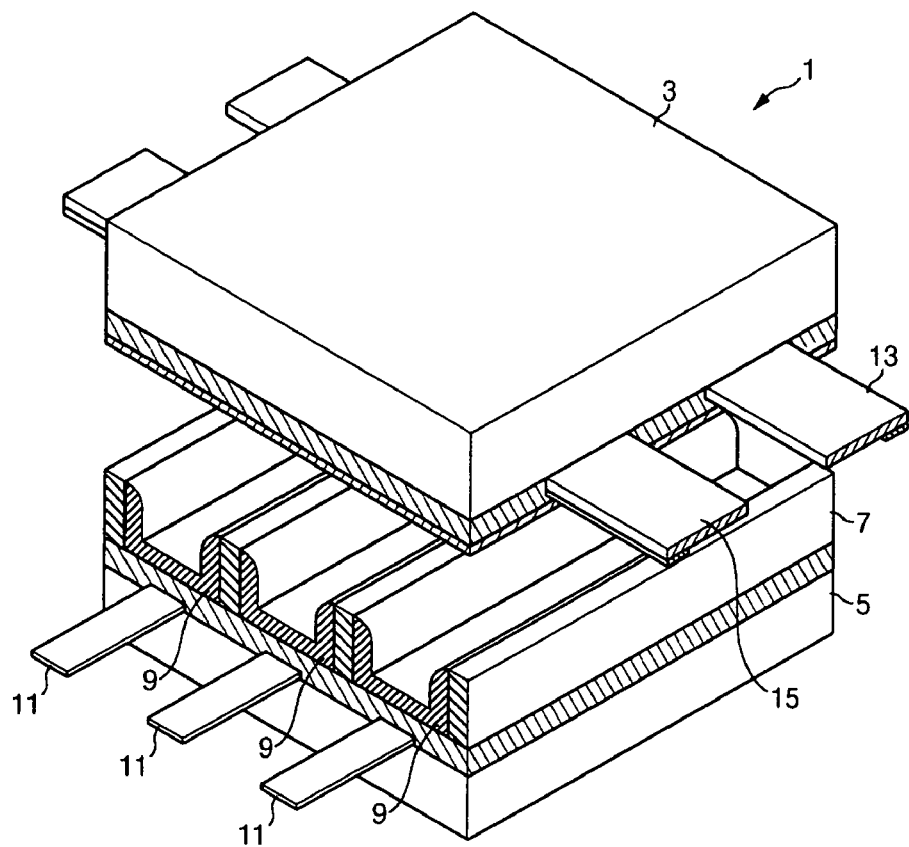
FIG. 1 is a perspective view showing the structure of a plasma display panel.
Figure 2:
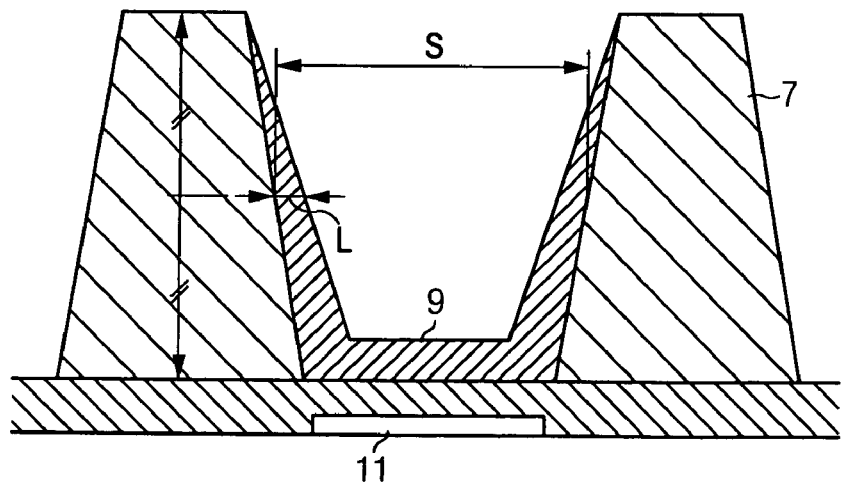
FIG. 2 is a cross-sectional view showing a phosphor layer of a plasma display panel.

In accordance with the present invention a plasma display panel is provided having good luminance and good color purity characteristics as well as a good optical characteristic in which panel spots do not appear, by adjusting the side thickness of the phosphor layer within a certain range. That is, the present invention provides a plasma display panel comprising a pair of substrates having at least a transparent front surface to provide a discharge space therebetween. A plurality of barrier ribs is formed on one substrate to partition the discharge space into many spaces. A group of electrodes is formed on the substrates to generate a discharge in the discharge space partitioned by the barrier ribs. A red, a green, and a blue phosphor layer are formed on the surface of discharge space partitioned by the barrier ribs, wherein the side thickness of the phosphor layer contacting the barrier ribs is controlled within a certain range.

In the plasma display panel, a color temperature of emitted white light is 8000 K or higher, and it is controlled to have the color coordinate of x=0.280-0.290 and y=0.280-0.290. In order to control the color temperature of the emitted white light within the desired range, the luminance ratio of the red, the green, and the blue needs to be controlled. In this case, the luminance of the red color and the green color are lowered to below the maximum luminance level. When the luminance is lowered to below the maximum level, the red and the green colors are expressed by 256 or less gray levels (in a case of 8 subfields). Accordingly, in a case when the color temperature of white light emission is controlled within the desired range, the decreases of the red and the green luminance should be minimized.

Japanese Patent Laid-open Publication No. H10-269949 discloses that the deterioration of display quality can be prevented and the decrease of luminance can be minimized by adjusting the thickness of a red phosphor layer, a green phosphor layer and a blue phosphor layer contacting the substrate as different levels for each of the phosphor layers. However, the luminance of the phosphor layer is not affected by its reduced thickness.

In accordance with an exemplary embodiment of the present invention, the decrease of luminance is minimized by adjusting the side thickness of the phosphor layer to satisfy the following condition:

when $D$ is $(S-2L)/S$, $D \geq 0.64$ wherein

S is a distance between barrier ribs at half the height of the barrier rib; and L is a side thickness at half the height of the barrier rib of the phosphor layer coated on the barrier rib.

According to embodiments of the present invention, the optical and discharge characteristics can be improved by adjusting the side thickness of the phosphor layer to satisfy the condition $D \geq 0.64$, advantageously $0.64 \leq D \leq 0.89$, and more advantageously $0.73 \leq D \leq 0.89$. When D is less than 0.64, it is not advantageous since the discharge spot appears.

Further, when $D_r$, $D_g$, and $D_b$ respectively represent the D value of a red discharge cell, a green discharge cell and a blue discharge cell which are respectively formed with a red phosphor layer, a green phosphor layer and a blue phosphor layer, it is advantageous to satisfy the conditions $0.73 \leq D_r \leq 0.89$, $0.69 \leq D_g \leq 0.89$, and $0.76 \leq D_b \leq 0.89$; more advantageous $0.83 \leq D_r \leq 0.89$, $0.76 \leq D_g \leq 0.89$, and $0.76 \leq D_b \leq 0.84$; and still more advantageous $0.85 \leq D_r \leq 0.89$, $0.81 \leq D_g \leq 0.89$, and $0.79 \leq D_b \leq 0.84$.

Further, when $D_r$, $D_g$, and $D_b$ are respectively represented for the D value of a red discharge cell, a green discharge cell and a blue discharge cell which are respectively formed with a red phosphor layer, a green phosphor layer and a blue phosphor layer, they are advantageously controlled to satisfy the condition $D_r \geq D_g \geq D_b$. When the side thicknesses T of a red phosphor layer, a green phosphor layer and a blue phosphor layer are respectively represented by $T_r$, $T_g$, $T_b$, they are satisfied by the condition $T_r \leq T_g \leq T_b$.

According to the present invention, the red phosphor is prepared by mixing $Y(V,P)O_4$:Eu having good color purity and afterglow characteristics and $(Y,Gd)BO_3$:Eu having a good luminance characteristic. By mixing these two phosphors, the red color purity and afterglow characteristics are improved while maintaining the suitable red luminance. Although the luminance of the red color of the mixed red phosphor is somewhat reduced when compared to the case of employing only $(Y,Gd)BO_3$:Eu, it is possible to minimize the decrease of the luminance when adjusting the color temperature of the panel, and thereby the luminance and the color purity of the panel are both improved. When $Y(V,P)O_4$:Eu is mixed with $(Y,Gd)BO_3$:Eu, the luminance of the phosphor is less sensitive to the side thickness of the phosphor than in the case of employing only $(Y,Gd)BO_3$:Eu, so the thickness of the phosphor layer can be controlled to a level similar to those of the green and the blue phosphor layers.

The amount of $Y(V,P)O_4$:Eu relative to the total amounts of $Y(V,P)O_4$:Eu and $(Y,Gd)BO_3$:Eu may be within a range of about 20 to about 80% by weight. The amount of $Y(V,P)O_4$:Eu relative to the total amounts of $Y(V,P)O_4$:Eu and $(Y,Gd)BO_3$:Eu is advantageously within a range of about 40 to about 80% by weight, and more advantageous a range of about 50 to about 80% by weight. When the amount of $Y(V,P)O_4$:Eu is less than 20% by weight, the color purity and the afterglow characteristics are less improved, while when the amount is more than 80% by weight, the luminance is excessively deteriorated.

The green phosphor of the present invention may be selected from the group consisting of $Zn_2SiO_4$:Mn, $(Zn,A)_2SiO_4$:Mn where A is an alkaline metal, and mixtures thereof. It may be further mixed with at least one phosphor selected from the group consisting of $BaAl_{12}O_{19}$:Mn, $(Ba, Sr, Mg)O.\alpha Al_2O_3$:Mn where $\alpha$ is from 1 to 23, $MgAl_xO_y$:Mn where x is from 1 to 10 and y is from 1 to 30, $LaMgAl_xO_y$:Tb, Mn where x is from 1 to 14 and y is from 8 to 47, and $ReBO_3$:Tb where Re is at least one rare earth element selected from the group consisting of Sc, Y, La, Ce, and Gd. In a case of mixing them, it advantageously comprises 10 to 70% by weight of a green phosphor selected from the group consisting of a $Zn_2SiO_4$:Mn, $(Zn,A)_2SiO_4$:Mn where A is an alkaline metal, and mixtures thereof.

The blue phosphor of the present invention may include, but is not limited to, $BaMgAl_{10}O_{17}$:Eu, $CaMgSi_2O_6$:Eu, $CaWO_4$:Pb, $Y_2SiO_5$:Eu, or mixtures thereof.

According to the present invention, the phosphors are used as stated above and the side thicknesses of the red, the green, and the blue phosphor layers are controlled within the above-mentioned conditions, and thereby the decrease of the red luminance is minimized when adjusting the color temperature of the panel so that the luminance and the color purity characteristics of the plasma display panel are optimized. Further, in order to determine the relationship of differences of human visual senses, the change of optical characteristics depending upon the side thickness of the phosphor layer is measured using the CIE 1976($L^*u^*v^*$) color difference formula. The suitable thickness of phosphor layer and the deviation of thickness are determined using the color difference, and in the real field, the quality of the plasma display panel is improved by determining the thickness of the each phosphor layer within the deviation range.

According to the CIE 1931 standard calorimetric system, 3 stimulus X, Y, and Z are determined from the color matching function $\bar{x}(\lambda)$, $\bar{y}(\lambda)$, $\bar{z}(\lambda)$ (wherein the bar above of each of x, y, and z indicates the mean value thereof). The color coordinates of x and y can be determined from the 3 stimulus X, Y, and Z, and the color coordinate can be measured by CA-100. However, the demerit of the CIE 1931 standard colorimetric system is that the color difference determined from the xy diagram is intellectually not uniform. Accordingly, the CIE 1976 uniform chromaticity scale diagram or the CIE 1976 UCS diagram has recently been accepted since the identical color difference with respect to the same color is measured from the equal distance on the diagram. Accordingly, the color difference is determined by the following CIE 1976 ($L^*u^*v$) color difference Formula 1:

$$\Delta E^*_{uv} = \{(\Delta L^*)^2 + (\Delta u^*)^2 + (\Delta v^*)^2\}^{1/2} \quad \text{(Formula 1)}$$

$$L^* = 116(Y/Y_n)^{1/3} - 16, \, (Y/Y_n > 0.008856)$$

$$L^* = 903.3(Y/Y_n)^{1/3}, \, (Y/Y_n \leq 0.008856)$$

$$u^* = 13L^*(u' - u_n')$$

$$v^* = 13L^*(v' - v_n')$$

$$u_n' = 0.2009, \, v_n' = 0.5444,$$

wherein Y is a luminance measured by CA-100.

The inert discharge gas injected to the discharge space of the plasma display panel may include Ne, He, Xe, Kr, and so on, and it may be added with an additional gas such as oxygen, nitrogen, and so on. Among them, the neon emitting an orange-red based light causes problems in that the color purity of the plasma display panel is deteriorated. According to the present invention, when the side thickness of the phosphor layer is controlled to satisfy the condition of $D \geq 0.64$, the intensity of orange-red based light can be decreased.

The red, green, and blue phosphors are respectively added to a binder and a solvent to provide a phosphor paste, and the resultant phosphor paste is coated on the surface of the discharge cell to provide a phosphor layer.

The binder may include, but is not limited to, a cellulose-based resin, an acryl-based resin, or a mixture thereof. The cellulose-based resin may be methyl cellulose, ethyl cellulose, propyl cellulose, hydroxy methyl cellulose, hydroxy ethyl cellulose, hydroxy propyl cellulose, hydroxy ethyl propyl cellulose, or a mixture thereof. The acryl-based resin may be a copolymer of an acrylic monomer such as poly methyl methacrylate, poly isopropyl methacrylate, poly isobutyl methacrylate, methyl methacrylate, ethyl methacrylate, propyl methacrylate, butyl methacrylate, hexyl methacrylate, 2-ethyl hexyl methacrylate, benzyl methacrylate, dimethyl amino ethyl methacrylate, hydroxy ethyl methacrylate, hydroxy propyl methacrylate, hydroxy butyl methacrylate, phenoxy 2-hydroxy propyl methacrylate, glycidyl methacrylate, methyl acrylate, ethyl acrylate, propyl acrylate, butyl acrylate, hexyl acrylate, 2-ethyl hexyl acrylate, benzyl acrylate, dimethyl amino ethyl acrylate, hydroxy ethyl acrylate, hydroxy propyl acrylate, hydroxy butyl acrylate, phenoxy 2-hydroxy propyl acrylate, glycidyl acrylate, or a mixture thereof. If desired, a small amount of inorganic binder may be added to the phosphor paste composition. The amount of the binder is advantageously about 2% to about 8% by weight relative to the phosphor paste composition.

The solvent may include any conventional one for the phosphor paste composition such as alcohol-based, ether-based, or ester-based solvents, or a mixture thereof, and more advantageously butyl carbitol (BC), butyl carbitol acetate (BCA), terpineol, or a mixture thereof. When the amount of the solvent is outside the above-mentioned range, the rheology is inappropriate so that it is hard to apply the phosphor layer. Considering this point, the amount of the solvent is advantageously between about 25 and about 75% by weight.

Other agents may be further added thereto to improve the rheology and the processability of the composition. The agents may include, but are not limited to, a photosensitizer such as benzophenon, a dispersing agent, a silicon-based antifoaming agent, a smoothing agent, a plasticizer, an antioxidant, or a mixture thereof, which are commercially available to one skilled in the art.

As the various manufacturing methods and structures of the phosphor layer for the plasma display panel are known to one having ordinary skill in the art, a detailed description relating thereto is omitted herein.

The following examples illustrate the present invention in further detail. However, it is understood that the present invention is not limited by these examples.

EXAMPLE 1

Red Phosphor Layer

60% by weight of $Y(V,P)O_4$:Eu 60 and 40% by weight of $(Y,Gd)BO_3$:Eu were mixed to provide a red phosphor. 40% by weight of the resultant red phosphor was added to a binder solution in which a binder of ethyl cellulose was dissolved in a mixed solvent of carbitol acetate and terpineol in volume ratio of 3:7 to obtain a phosphor paste composition. The amount of the phosphor was varied to 30 wt. %, 40 wt. %, 47 wt. %, and 52 wt. %, and the phosphor paste composition was printed on the surface of the discharge cell and sintered to form a phosphor layer to provide a plasma display panel by the conventional method. Then, only the red phosphor layer was lighted up, and the CIE color coordinate and the relative luminance of the red color light emitted from the plasma display panel were measured using a contact luminance meter (CA-100). The color difference was calculated using the color difference formula represented by Formula 1. The display quality was determined by examining with the naked eye whether spots appeared because of the local luminance difference upon turning on the panel.

TABLE 1

| Amount of Red Phosphor (wt. %) | Side Thickness (μm) | $D_r$ | Color Coordinate x | Color Coordinate y | Relative Luminance (%) | UCS, Color Difference | Display Quality* |
|---|---|---|---|---|---|---|---|
| 30 | 12 | 0.89 | 0.660 | 0.328 | 100 | 6.4 | ◎ |
| 40 | 19.4 | 0.83 | 0.659 | 0.327 | 103.7 | 0 | ◎ |
| 47 | 37.2 | 0.67 | 0.657 | 0.328 | 108 | 2.8 | ◎ |
| 52 | 40.3 | 0.64 | 0.657 | 0.328 | 103.1 | 5.3 | ○ |

*Display Quality: ◎: Excellent, ○: Good, X: Discharge spot appeared

As shown in Table 1, when the thickness of the red phosphor layer was adjusted for $D_r$ within the range of 0.64 to 0.89, the discharge spot did not appear and the display quality was improved, and the color purity and luminance characteristics were also both improved. When the red phosphor was prepared by mixing $Y(V,P)O_4$:Eu and $(Y,Gd)BO_3$:Eu, although the side thickness was thicker, the color difference was less altered. Thereby, the liberty of choice to design the side thickness is increased.

EXAMPLE 2

Green Phosphor Layer

Green phosphor of $Zn_2SiO_4$:Mn was added to a binder solution in which a binder of ethyl cellulose was dissolved in a mixed solvent of carbitol acetate and terpineol in a volume ratio of 3:7 to obtain a phosphor paste composition. The amount of the phosphor was varied to 30 wt. %, 40 wt. %, 50 wt. %, and 55 wt. %, and the phosphor paste composition was printed on the surface of the discharge cell and sintered to form a phosphor layer. Using the phosphor layer, a plasma display panel was obtained by the conventional method.

Then, only the green phosphor layer was lighted up, and the CIE color coordinate and the relative luminance of the green color light emitted from the plasma display panel were measured using the contact luminance meter (CA-100). The color difference was calculated using the color difference formula represented by Formula 1. The display quality was determined by examining with the naked eye whether spots appeared because of the local luminance difference upon turning on the panel.

TABLE 2

| Amount of Green Phosphor (wt. %) | Side Thickness (μm) | $D_g$ | Color Coordinate x | Color Coordinate y | Relative Luminance (%) | UCS, Color Difference | Display Quality* |
|---|---|---|---|---|---|---|---|
| 30 | 14.6 | 0.89 | 0.259 | 0.678 | 100 | 10.8 | ◎ |
| 40 | 25.4 | 0.81 | 0.253 | 0.683 | 104.3 | 0 | ◎ |
| 50 | 41 | 0.69 | 0.261 | 0.674 | 106.5 | 8 | ○ |
| 55 | 49.2 | 0.63 | 0.266 | 0.670 | 105.6 | 14.3 | X |

*Display Quality: ◎: Excellent, ○: Good, X: Discharge spot appeared

As shown in Table 2, when the thickness of the green phosphor layer was adjusted for Dg within the range of 0.64 to 0.89, the discharge spot did not appear and the display quality was improved. When the side thickness of the green phosphor layer was more than 40 μm, although the color purity was decreased and the luminance was improved, the color purity and the luminance were both controlled to an optimal level when $D_g$ was 0.81.

EXAMPLE 3

Blue Phosphor Layer

Blue phosphor of $BaMgAl_{10}O_{17}$:Eu was added to a binder solution in which a binder of ethyl cellulose was dissolved in a mixed solvent of carbitol acetate and terpineol in a volume ratio of 3:7 to obtain a phosphor paste composition. The amount of the phosphor was varied to 30 wt. %, 40 wt. %, 50 wt. %, and 65 wt. %, and the phosphor paste composition was printed on the surface of the discharge cell and sintered to form a phosphor layer. Using the phosphor layer, a plasma display panel was obtained by the conventional method. Then, only the blue phosphor layer was lighted up, and the CIE color coordinate and the relative luminance of the blue color light emitted from the plasma display panel were measured using the contact luminance meter (CA-100). The color difference was calculated using the color difference formula represented by Formula 1. The display quality was determined by examining with the naked eye whether spots appeared because of the local luminance difference upon turning on the panel.

As shown in Table 3, when the thickness of the green phosphor layer was adjusted for $D_b$ within the range of 0.64 to 0.89, the discharge spot did not appear and the display quality was improved. When the side thickness of the green phosphor layer was more than 40 μm, although the color purity and the luminance were decreased, the color purity and the luminance were both controlled to an optimal level when $D_b$ was 0.76.

As described in the above, the plasma display panel of the present invention can prevent generation of a discharge spot and improve the luminance and color purity by adjusting the side thickness of the phosphor coated on the barrier rib within the above range. Further, as the red phosphor of the present invention is prepared by mixing $Y(V,P)O_4$:Eu and $(Y,Gd)BO_3$:Eu, it is possible to provide a plasma display panel having good color purity and an improved afterglow characteristic.

While the present invention has been described in detail with reference to exemplary embodiments, those skilled in the art will appreciate that various modifications and substitutions can be made thereto without departing from the spirit and scope of the present invention as set forth in the appended claims.

What is claimed is:

1. A plasma display panel comprising a red phosphor layer, a green phosphor layer, and a blue phosphor layer,
    wherein the thickness of a phosphor layer coated on a barrier rib is satisfied by the following condition: $0.67 \leq D_r \leq 0.89$, $0.69 \leq D_g \leq 0.89$, and $0.64 \leq D_b \leq 0.84$
    where D is (S−2L)/S, and $D_r$, $D_g$, and $D_b$ respectively represent a red discharge cell D value, a green discharge cell D value and a blue discharge cell D value which are respectively formed with the red phosphor layer, the green phosphor layer and the blue phosphor layer,
    wherein S is a distance between barrier ribs at half the height of the barrier rib and L is a side thickness of the phosphor layer coated on the barrier rib,
    wherein the red phosphor layer comprises $Y(V,P)O_4$:Eu and $(Y,Gd)BO_3$:Eu

TABLE 3

| Amount of Blue Phosphor (wt. %) | Side Thickness (μm) | $D_b$ | Color Coordinate x | Color Coordinate Y | Relative Luminance (%) | UCS, Color Difference | Display Quality* |
|---|---|---|---|---|---|---|---|
| 30 | 23.6 | 0.84 | 0.156 | 0.096 | 100 | 5.1 | ◎ |
| 40 | 35.8 | 0.76 | 0.155 | 0.097 | 103.5 | 0 | ◎ |
| 50 | 54.4 | 0.64 | 0.157 | 0.099 | 95 | 20.4 | ○ |
| 55 | 67.6 | 0.56 | 0.160 | 0.100 | 93.1 | 27.5 | X |

*Display Quality: ◎: Excellent, ○: Good, X: Discharge spot appeared wherein the barrier rib is on a substrate, the barrier rib having a barrier rib base proximal to the substrate and a barrier rib top distal from the substrate, and wherein a thickness of the barrier rib increases in a direction from the barrier rib top to the barrier rib base.

2. The plasma display panel according to claim 1, which is satisfied by the conditions of $0.83 \leq D_r \leq 0.89$, $0.76 \leq D_g \leq 0.89$, and $0.76 \leq D_b \leq 0.84$.

3. The plasma display panel according to claim 2, which is satisfied by the conditions of $0.85 \leq D_r \leq 0.89$, $0.81 \leq D_g \leq 0.89$, and $0.79 \leq D_b \leq 0.84$.

4. The plasma display panel according to claim 1, which is satisfied by the condition of $T_r \leq T_g \leq T_b$, when $T_r$, $T_g$, and $T_b$ respectively represent the side thickness T of the red phosphor layer, the green phosphor layer and the blue phosphor layer.

5. The plasma display panel according to claim 1, which is satisfied by the condition of $D_r \geq D_g \geq D_b$.

6. The plasma display panel according to claim 1, wherein the red phosphor comprises 20 to 80% by weight of $Y(V,P)O_4$:Eu and 80 to 20% by weight of $(Y,Gd)BO_3$:Eu.

7. The plasma display panel according to claim 6, wherein the red phosphor comprises 40 to 80% by weight of $Y(V,P)O_4$:Eu and 60 to 20% by weight of $(Y,Gd)BO_3$:Eu.

8. The plasma display panel according to claim 7, wherein the red phosphor comprises 50 to 80% by weight of $Y(V,P)O_4$:Eu and 50 to 20% by weight of $(Y,Gd)BO_3$:Eu.

9. The plasma display panel according to claim 1, wherein the green phosphor is selected from the group consisting of $Zn_2SiO_4$:Mn, $(Zn,A)_2SiO_4$:Mn (A is an alkaline metal), and a mixture thereof.

10. The plasma display panel according to claim 9, wherein the green phosphor further comprises at least one phosphor selected from the group consisting of $BaAl_{12}O_{19}$:Mn, (Ba, Sr, Mg)O.$\alpha Al_2O_3$:Mn ($\alpha$ is 1 to 23), $MgAl_xO_y$:Mn (x is 1 to 10, y is 1 to 30), $LaMgAl_xO_y$:Tb,Mn (x is 1 to 14, y is 8 to 47), and $ReBO_3$:Tb (Re is at least one rare earth element selected from the group consisting of Sc, Y, La, Ce, and Gd).

11. The plasma display panel according to claim 1, wherein the blue phosphor is selected from the group consisting of $BaMgAl_{10}O_{17}$:Eu, $CaMgSi_2O_6$:Eu, $CaWO_4$:Pb, $Y_2SiO_5$:Eu, and a mixture thereof.

12. A plasma display panel comprising:
a pair of substrates having at least transparent front surface to provide a discharge space therebetween;
a plurality of barrier ribs on one substrate to partition the discharge space into many spaces;
a group of electrodes on the substrates to generate a discharge in the discharge space partitioned by the barrier ribs; and
a red phosphor layer, a green phosphor layer and a blue phosphor layer on the surface of the discharge space partitioned by the barrier ribs,
wherein the side thickness of phosphor layers on the barrier ribs is controlled to satisfy the following condition $0.67 \leq D_r \leq 0.89$, $0.69 \leq D_g \leq 0.89$, and $0.64 \leq D_b \leq 0.84$
where D is (S−2L)/S, and $D_r$, $D_g$, and $D_b$ respectively represent a red discharge cell D value, a green discharge cell D value and a blue discharge cell D value which are respectively formed with the red phosphor layer, the green phosphor layer and the blue phosphor layer,
wherein S is a distance between barrier ribs at half the height of the barrier rib and L is a side thickness of the phosphor layer coated on the barrier rib,
wherein the red phosphor layer comprises $Y(V,P)O_4$:Eu and $(Y,Gd)BO_3$:Eu wherein the barrier rib is on a substrate, the barrier rib having a barrier rib base proximal to the substrate and a barrier rib top distal from the substrate, and wherein a thickness of the barrier rib increases in a direction from the barrier rib top to the barrier rib base.

13. The plasma display panel according to claim 12, which is satisfied by the conditions of $0.83 \leq D_r \leq 0.89$, $0.76 \leq D_g \leq 0.89$, and $0.76 \leq D_b \leq 0.84$.

14. The plasma display panel according to claim 13, which is satisfied by the conditions of $0.85 \leq D_r \leq 0.89$, $0.81 \leq D_g \leq 0.89$, and $0.79 \leq D_b \leq 0.84$.

15. The plasma display panel according to claim 12, which is satisfied by the condition of $T_r \leq T_g \leq T_b$, when $T_r$, $T_g$, and $T_b$ respectively represent the side thickness T of the red phosphor layer, the green phosphor layer and the blue phosphor layer.

16. The plasma display panel according to claim 12, which is satisfied by the condition of $D_r \geq D_g \geq D_b$.

17. The plasma display panel according to claim 12, wherein the red phosphor comprises 20 to 80% by weight of $Y(V,P)O_4$:Eu and 80 to 20% by weight of $(Y,Gd)BO_3$:Eu.

18. The plasma display panel according to claim 17, wherein the red phosphor comprises 40 to 80% by weight of $Y(V,P)O_4$:Eu and 60 to 20% by weight of $(Y,Gd)BO_3$:Eu.

19. The plasma display panel according to claim 18, wherein the red phosphor comprises 50 to 80% by weight of $Y(V,P)O_4$:Eu and 50 to 20% by weight of $(Y,Gd)BO_3$:Eu.

20. The plasma display panel according to claim 12, wherein the green phosphor is selected from the group consisting of $Zn_2SiO_4$:Mn, $(Zn,A)_2SiO_4$:Mn (A is an alkaline metal), and a mixture thereof.

21. The plasma display panel according to claim 20, wherein the green phosphor further comprises at least one phosphor selected from the group consisting of $BaAl_{12}O_{19}$:Mn, (Ba, Sr, Mg)O.$\alpha Al_2O_3$:Mn ($\alpha$ is 1 to 23), $MgAl_xO_y$:Mn (x is 1 to 10, y is 1 to 30), $LaMgAl_xO_y$:Tb,Mn (x is 1 to 14, y is 8 to 47), and $ReBO_3$:Tb (Re is at least one rare earth element selected from the group consisting of Sc, Y, La, Ce, and Gd).

22. The plasma display panel according to claim 12, wherein the blue phosphor is selected from the group consisting of $BaMgAl_{10}O_{17}$:Eu, $CaMgSi_2O_6$:Eu, $CaWO_4$:Pb, $Y_2SiO_5$:Eu, and a mixture thereof.

23. A plasma display panel phosphor layering having a red phosphor layer, a green phosphor layer, and a blue phosphor layer,
wherein the red phosphor layer comprises $Y(V,P)O_4$:Eu and $(Y,Gd)BO_3$:Eu and the thickness of a phosphor layer coated on a barrier rib is satisfied by the following condition: $0.67 \leq D_r \leq 0.89$, $0.69 \leq D_g \leq 0.89$, and $0.64 \leq D_b \leq 0.84$
where D is (S−2L)/S, and $D_r$, $D_g$, and $D_b$ respectively represent a red discharge cell D value, a green discharge cell D value and a blue discharge cell D value which are respectively formed with the red phosphor layer, the green phosphor layer and the blue phosphor layer,
wherein:
S is a distance between barrier ribs at half the height of the barrier rib; and
L is a side thickness at half the height of the barrier rib of the red phosphor layer coated on the barrier rib,
wherein the baffler rib is on a substrate, the baffler rib having a barrier rib base proximal to the substrate and a baffler rib top distal from the substrate, and
wherein at least one of the red phosphor layer, the green phosphor layer, and the blue phosphor layer has a side thickness at the baffler rib top thinner than a side thick- 24. The plasma display panel phosphor layering according to claim 23, which is satisfied by the conditions of $0.83 \leq D_r \leq 0.89$, $0.76 \leq D_g \leq 0.89$, and $0.76 \leq D_b \leq 0.84$.

25. The plasma display panel phosphor layering according to claim 24, which is satisfied by the conditions of $0.85 \leq D_r \leq 0.89$, $0.81 \leq D_g \leq 0.89$, and $0.79 \leq D_b \leq 0.84$.

26. The plasma display panel phosphor layering according to claim 23, which is satisfied by the condition of $T_r \leq T_g \leq T_b$, when $T_r$, $T_g$, and $T_b$ respectively represent the side thickness T of the red phosphor layer, the green phosphor layer and the blue phosphor layer.

27. The plasma display panel phosphor layering according to claim 23, which is satisfied by the condition of $D_r \geq D_g \geq D_b$.

28. The plasma display panel phosphor layering according to claim 23, wherein the red phosphor comprises 20 to 80% by weight of $Y(V,P)O_4$:Eu and 80 to 20% by weight of $(Y,Gd)BO_3$:Eu.

29. The plasma display panel phosphor layering according to claim 28, wherein the red phosphor comprises 40 to 80% by weight of $Y(V,P)O_4$:Eu and 60 to 20% by weight of $(Y,Gd)BO_3$:Eu.

30. The plasma display panel phosphor layering according to claim 29, wherein the red phosphor comprises 50 to 80% by weight of $Y(V,P)O_4$:Eu and 50 to 20% by weight of $(Y,Gd)BO_3$:Eu.

31. The plasma display panel phosphor layering according to claim 23, wherein the green phosphor is selected from the group consisting of $Zn_2SiO_4$:Mn, $(Zn,A)_2SiO_4$:Mn where A is an alkaline metal, and mixtures thereof.

32. The plasma display panel phosphor layering according to claim 31, wherein the green phosphor further comprises at least one phosphor selected from the group consisting of $BaAl_{12}O_{19}$:Mn, $(Ba, Sr, Mg)O.\alpha Al_2O_3$:Mn where $\alpha$ is from 1 to 23, $MgAl_xO_y$:Mn where x is from 1 to 10 and y is from 1 to 30, $LaMgAl_xO_y$:Tb,Mn where x is from 1 to 14 and y is from 8 to 47, and $ReBO_3$:Tb where Re is at least one rare earth element selected from the group consisting of Sc, Y, La, Ce, and Gd.

33. The plasma display panel phosphor layering according to claim 23, wherein the blue phosphor is selected from the group consisting of $BaMgAl_{10}O_{17}$:Eu, $CaMgSi_2O_6$:Eu, $CaWO_4$:Pb, $Y_2SiO_5$:Eu, and mixtures thereof.

34. A plasma display panel comprising:

a pair of substrates having at least transparent front surface to provide a discharge space therebetween;

a plurality of barrier ribs on one substrate to partition the discharge space into many spaces;

a group of electrodes on the substrates to generate a discharge in the discharge space partitioned by the barrier ribs; and a red phosphor layer, a green phosphor layer and a blue phosphor layer on the surface of the discharge space partitioned by the barrier ribs, wherein the red phosphor layer comprises $Y(V,P)O_4$:Eu and $(Y,Gd)BO_3$:Eu;

wherein the side thickness of phosphor layers on the barrier ribs is controlled to satisfy the following condition: $0.67 \leq D_r \leq 0.89$, $0.69 \leq D_g \leq 0.89$, and $0.64 \leq D_b \leq 0.84$ where D is (S−2L)/S, and $D_r$, $D_g$, and $D_b$ respectively represent a red discharge cell D value, a green discharge cell D value and a blue discharge cell D value which are respectively formed with the red phosphor layer, the green phosphor layer and the blue phosphor layer, wherein:

S is a distance between barrier ribs at half the height of the barrier rib; and

L is a side thickness at half the height of the barrier rib of the phosphor layer coated on the barrier rib, wherein the barrier rib is on a substrate, the barrier rib having a barrier rib base proximal to the substrate and a barrier rib top distal from the substrate, and wherein at least one of the red phosphor layer, the green phosphor layer, and the blue phosphor layer has a side thickness at the barrier rib top thinner than a side thickness at half the height of the barrier rib between the barrier rib top and the barrier rib base.

35. The plasma display panel according to claim 34, which is satisfied by the conditions of $0.83 \leq D_r \leq 0.89$, $0.76 \leq D_g 0.89$, and $0.76 \leq D_b \leq 0.84$.

36. The plasma display panel according to claim 35, which is satisfied by the conditions of $0.85 \leq D_r \leq 0.89$, $0.81 \leq D_g \leq 0.89$, and $0.79 \leq D_b \leq 0.84$.

37. The plasma display panel according to claim 34, which is satisfied by the condition of $T_r \leq T_g \leq T_b$, when $T_r$, $T_g$, and $T_b$ respectively represent the side thickness T of the red phosphor layer, the green phosphor layer and the blue phosphor layer.

38. The plasma display panel according to claim 34, which is satisfied by the condition of $D_r \geq D_g \geq D_b$.

39. The plasma display panel according to claim 34, wherein the red phosphor comprises 20 to 80% by weight of $Y(V,P)O_4$:Eu and 80 to 20% by weight of $(Y,Gd)BO_3$:Eu.

40. The plasma display panel according to claim 39, wherein the red phosphor comprises 40 to 80% by weight of $Y(V,P)O_4$:Eu and 60 to 20% by weight of $(Y,Gd)BO_3$:Eu.

41. The plasma display panel according to claim 40, wherein the red phosphor comprises 50 to 80% by weight of $Y(V,P)O_4$:Eu and 50 to 20% by weight of $(Y,Gd)BO_3$:Eu.

42. The plasma display panel according to claim 34, wherein the green phosphor is selected from the group consisting of $Zn_2SiO_4$:Mn, $(Zn,A)_2SiO_4$:Mn where A is an alkaline metal, and mixtures thereof.

43. The plasma display panel according to claim 42, wherein the green phosphor further comprises at least one phosphor selected from the group consisting of $BaAl_{12}O_{19}$:Mn, $(Ba, Sr, Mg)O.\alpha Al_2O_3$:Mn where $\alpha$ is from 1 to 23, $MgAl_xO_y$:Mn where x is from 1 to 10 and y is from 1 to 30, $LaMgAl_xO_y$:Tb,Mn where x is from 1 to 14 and y is from 8 to 47, and $ReBO_3$:Tb where Re is at least one rare earth element selected from the group consisting of Sc, Y, La, Ce, and Gd.

44. The plasma display panel according to claim 34, wherein the blue phosphor is selected from the group consisting of $BaMgAl_{10}O_{17}$:Eu, $CaMgSi_2O_6$:Eu, $CaWO_4$:Pb, $Y_2SiO_5$:Eu, and mixtures thereof.

* * * * *

UNITED STATES PATENT AND TRADEMARK OFFICE
CERTIFICATE OF CORRECTION

PATENT NO. : 7,408,299 B2
APPLICATION NO. : 10/999117
DATED : August 5, 2008
INVENTOR(S) : Seo-Young Choi and Hye-Kyong Kwon It is certified that error appears in the above-identified patent and that said Letters Patent is hereby corrected as shown below:

In the Claims

| | |
|---|---|
| Column 10, line 62, Claim 23 | Delete "wherein the baffler rib is on a substrate, the baffler", Insert --wherein the barrier rib is on a substrate, the barrier-- |
| Column 10, line 64, Claim 23 | Delete "baffler rib", Insert --barrier rib-- |
| Column 10, line 67, Claim 23 | Delete "thickness at the baffler rib", Insert --thickness at the barrier rib-- |
| Column 11, line 1, Claim 23 | Delete "baffler rib between", Insert --barrier rib between-- |
| Column 11, line 2, Claim 23 | Delete "baffler rib top and the baffler rib base", Insert --barrier rib top and the barrier rib base-- |

Signed and Sealed this

Seventeenth Day of February, 2009

JOHN DOLL
*Acting Director of the United States Patent and Trademark Office*